United States Patent
Lai et al.

(10) Patent No.: US 12,468,159 B2
(45) Date of Patent: *Nov. 11, 2025

(54) COMPUTING SYSTEM WITH HEAD WEARABLE DISPLAY

(71) Applicant: HES IP HOLDINGS, LLC, Austin, TX (US)

(72) Inventors: Jiunn-Yiing Lai, New Taipei (TW); Feng-Chun Yeh, New Taipei (TW); Yung-Chin Hsiao, New Taipei (TW)

(73) Assignee: Oomii Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,397

(22) Filed: Oct. 17, 2024

(65) Prior Publication Data
US 2025/0044599 A1    Feb. 6, 2025

Related U.S. Application Data

(63) Continuation-in-part of application No. 18/349,066, filed on Jul. 7, 2023, now Pat. No. 12,147,608.
(Continued)

(51) Int. Cl.
*G06F 3/01* (2006.01)
*G02B 27/01* (2006.01)
(Continued)

(52) U.S. Cl.
CPC .......... *G02B 27/0172* (2013.01); *G06T 7/593* (2017.01); *G06T 7/73* (2017.01);
(Continued)

(58) Field of Classification Search
CPC ........ G02B 27/0172; G02B 2027/0187; G06T 7/593; G06T 7/73; G06T 19/006; G06V 20/20; G06V 40/107
See application file for complete search history.

(56) References Cited

U.S. PATENT DOCUMENTS 5,677,795 A    10/1997  Hegg
8,248,458 B2    8/2012  Schowengerdt et al.
(Continued)

FOREIGN PATENT DOCUMENTS

JP    H08-262366 A    10/1996
JP    H11-142763 A    5/1999
(Continued)

*Primary Examiner* — Md Saiful A Siddiqui
(74) *Attorney, Agent, or Firm* — Chen Yoshimura LLP

(57) ABSTRACT

A computing system includes a distance measuring module, for detecting a spatial coordinate of a portion of a hand of a user, wherein the location or orientation of the portion of the hand is used for determining a first input data inputted by a user, a processing unit, generating an output data in based on the first input data; and a head wearable display. The processing unit is configured to compare a current spatial location of the binocular virtual image, which is located at the intersection of the optical path extension of the first collimated light signal and the optical path extension of the second collimated light signal, with the spatial coordinates of the part of the user's hand measured by the distance measuring module, and based on the comparison, to change the binocular virtual image or activate an application program.

10 Claims, 7 Drawing Sheets

Related U.S. Application Data

(60) Provisional application No. 63/389,698, filed on Jul. 15, 2022.

(51) Int. Cl.
  *G06F 1/16* (2006.01)
  *G06T 7/593* (2017.01)
  *G06T 7/73* (2017.01)
  *G06T 19/00* (2011.01)
  *G06V 20/20* (2022.01)
  *G06V 40/10* (2022.01)

(52) U.S. Cl.
  CPC ............ *G06T 19/006* (2013.01); *G06V 20/20* (2022.01); *G06V 40/107* (2022.01)

(56) References Cited

U.S. PATENT DOCUMENTS

| | | | |
|---|---|---|---|
| 10,031,338 | B2 | 7/2018 | Alexander et al. |
| 10,234,699 | B2 | 3/2019 | Yoshida |
| 12,231,613 | B2 | 2/2025 | Lai et al. |
| 2008/0117289 | A1* | 5/2008 | Schowengerdt ..... G02B 26/005 348/E13.032 |
| 2012/0242793 | A1* | 9/2012 | Im ........................... G06F 3/011 348/46 |
| 2013/0195204 | A1* | 8/2013 | Reznik ............... H04N 21/2343 375/240.26 |
| 2016/0234482 | A1 | 8/2016 | Bickerstaff et al. |
| 2017/0061696 | A1* | 3/2017 | Li ........................ G02B 27/017 |
| 2022/0311992 | A1* | 9/2022 | Lai ........................ G02B 30/26 |
| 2022/0413294 | A1* | 12/2022 | Hsiao ................... H04N 13/383 |

FOREIGN PATENT DOCUMENTS

| | | | |
|---|---|---|---|
| JP | 2000-214408 A | | 8/2000 |
| JP | 2008-509438 A | | 3/2008 |
| JP | 2013-211308 A | | 10/2013 |
| JP | 2018-166165 A | | 10/2018 |
| JP | 2023-500177 A | | 1/2023 |
| WO | 2015/079610 A1 | | 6/2015 |
| WO | WO 2021/092314 A | * | 5/2021 |

* cited by examiner

COMPUTING SYSTEM WITH HEAD WEARABLE DISPLAY

BACKGROUND OF THE DISCLOSURE

Technical Field

The present disclosure relates to a mobile computing system, more particularly relates to a mobile computing system combined with an augmented reality display system.

Description of the Related Art

Current computer systems, such as desktop computers, laptops, and tablet PCs, present information via flat panel displays. These traditional displays can only show two-dimensional information. Recently, augmented reality (AR) and virtual reality (VR) technologies have been developed using head-mounted displays (HMDs) to present images. Unlike traditional flat panel displays, HMDs in AR and VR can display three-dimensional images. Thus, the combination of HMDs with computer systems in mobile applications is expected to be a future trend.

The primary difference between augmented reality and virtual reality is that AR combines physical objects in the environment with virtual 3D images presented by the HMD, creating a mixed reality environment. In contrast, VR environments contain only virtual 3D images. Compared to VR, AR is more suitable for integration with computer systems to form a new-generation mobile computing system. Since current AR display technology is not yet fully mature, the development of AR HMD technology is crucial for the successful integration of AR with mobile computing systems.

SUMMARY OF THE DISCLOSURE

Compared to previous technologies, this disclosure offers significant advantages in addressing focal rivalry and vergence-accommodation conflict (VAC) in virtual reality (VR) and mixed reality (MR) displays. In augmented reality (AR) and MR, depth-of-field perception and the three-dimensional (3D) effect of virtual images are typically achieved through parallax imaging techniques. These techniques display the parallax image of the virtual image on a screen at a fixed distance from the user's left and right eyes. However, this distance often differs from the depth-of-field perception of the virtual image's viewpoint. Additionally, when a virtual image is superimposed on a real object to create AR or MR, the differing depths of the object and the screen from the user's eyes prevent the user's eyes from converging on both the virtual image and the real object simultaneously. This disclosure addresses these issues, providing users with an accurate depth perception that facilitates the seamless superposition of real and virtual objects.

Furthermore, this disclosure's computing system replaces conventional computing devices with a head-mounted display, enhancing user convenience. In addition to significantly increasing the display range, this system allows users to operate it anytime and anywhere.

BRIEF DESCRIPTION OF THE DRA WINGS

DESCRIPTION OF THE PREFERRED EMBODIMENTS

The terms used hereinafter are intended to be construed in their broadest reasonable manner, even when such terms are used in conjunction with techniques described in detail for particular embodiments. The following description may even emphasize certain terms; however, any terms that are construed in a restricted manner are specifically defined and described in this embodiment.

This disclosure presents a method for three-dimensional (3D) binocular virtual image imaging with depth. The term "fixate" refers to the binocular vision where a user's visual axes attempt to converge at the location of a viewed object, allowing the user to perceive the object's image. In this specification, the visual axis is the line connecting a fixation point to the central fovea of the macula through the pupil. Generally, when a user fixates on an object, the crystalline lens and ciliary muscle make adaption so the user can perceive the object's image clearly. In the present invention, when the user's eyes fixate on a part of the 3D binocular virtual image, the location of intersection of the visual axes of the two eyes and the location of intersection of the optical path extensions (such as left and right light signals) forming said part of the 3D binocular virtual image are substantially the same. This ensures that the depth of the 3D binocular virtual image perceived by the user matches the depth coordinates of the fixation point in real space, thereby avoiding vergence-accommodation conflict (VAC) and focal rivalry. The horizontal and vertical coordinates are also aligned, further preventing VAC and focal rivalry. Moreover, since the perceived coordinate location of the 3D binocular virtual image in physical 3D space matches the location of the user's binocular fixation, when the user touches this location with a part of the hand (e.g., the index fingertip or both the thumb and index finger), they can simultaneously fixate on and see both the hand and the 3D binocular virtual image at the same physical location. This enables more realistic interaction between virtual and real objects without the need for additional auxiliary media.

The principle of presenting a binocular virtual image and enabling the user to see the virtual image at specific 3D coordinates in the 3D physical space in accordance with this embodiment of the disclosure will be described below. In this disclosure, the term "light convergence angle" or "optical convergence angle" refer to the angle between optical paths or optical path extension of a first incident light signal and a second incident light signal (such as a left light signal and a right light signal), and the term "convergence angle" refers to the angle between the visual axes of a user's eyes.

Figure 1:
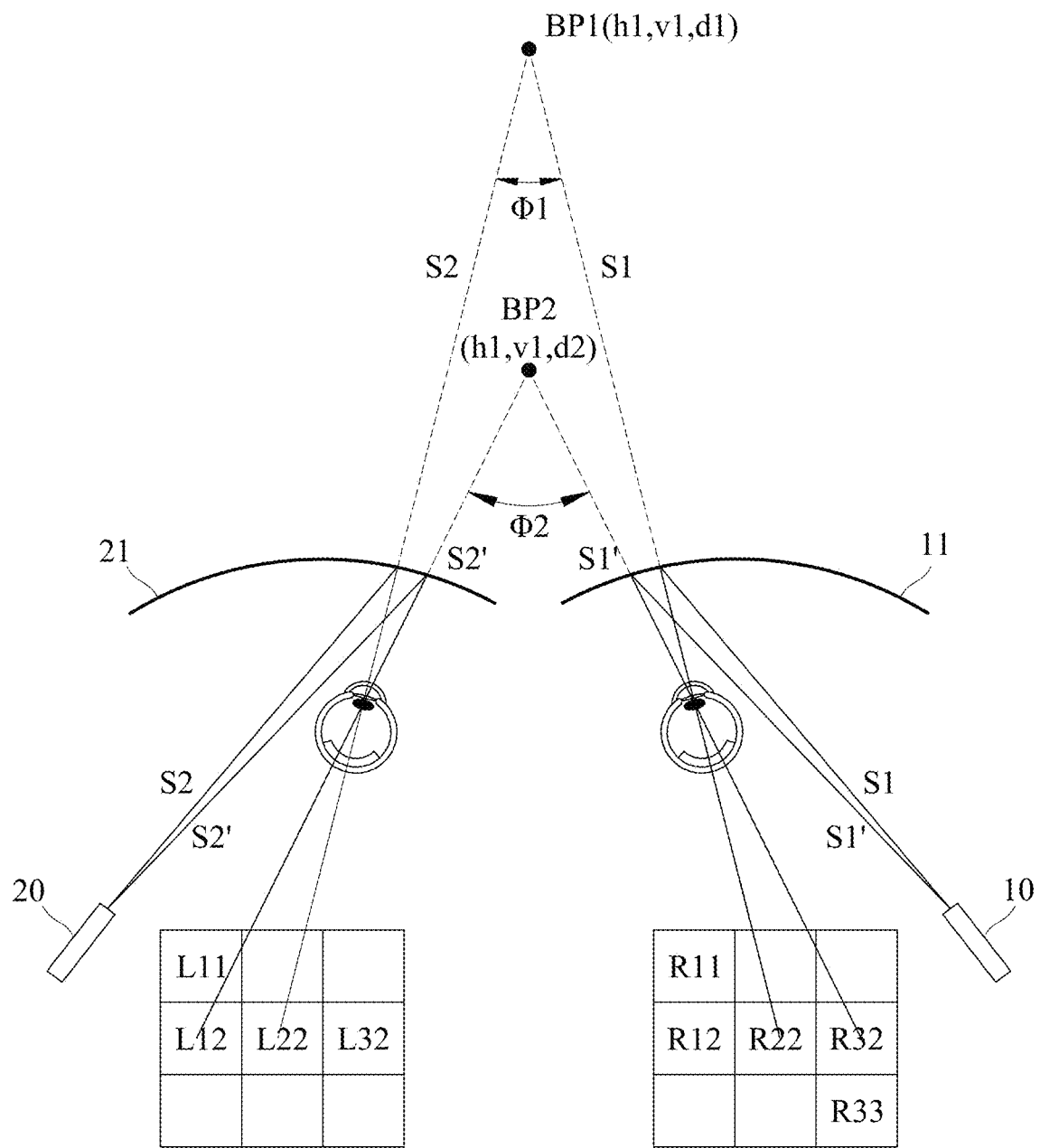
FIG. 1 is a schematic view showing a binocular virtual image imaging method in accordance with this disclosure.

With reference to FIG. 1, which shows a schematic view of an imaging method for a binocular virtual pixel with depth in accordance with this disclosure, a first binocular pixel BP1, as shown in the figure, is generated by brain image fusion after a user's first eye (such as the right eye) perceives a first collimated light signal S1 (such as a right light signal) and the user's second eye (such as the left eye) perceives a second collimated light signal S2 (such as a left light signal). In some embodiments, to reduce the volume of the head-mounted display, the first collimated light signal S1 and the second collimated light signal S2 can be reflected to the user's eyes by optical components with reflective property. This minimizes the problem of increasing the volume of the head-mounted display due to the long optical path. However, in other embodiments, the first collimated light signal S1 and the second collimated light signal S2 can enter the user's eyes directly after alignment or direction adjustment. A first optical convergence angle $\varphi 1$ is defined between the optical paths extension of the first collimated light signal S1 and the second collimated light signal S2, and the point of intersection of the optical path extensions of the first collimated light signal S1 and the second collimated light signal S2 is situated at the spatial coordinates (h1, v1, d1). Notice that the first collimated light signal S1 and the second collimated light signal S2 are collimated light signals so the optical path is clearly defined (unlike scattered light of ordinary light source). The reference point of the spatial coordinates (h1, v1, d1) (or the coordinates of the origin) can be set arbitrarily. For example, the reference point can be set at a location on the head-mounted display or at any specific location in the space. According to natural human vision, when a user watches the first binocular pixel BP1, the user's eyeballs naturally rotate towards the location of the spatial coordinates (h1, v1, d1). Under normal circumstances, the visual axes of both eyes will also naturally point to the location of the spatial coordinates (h1, v1, d1); theoretically, the point of intersection of the visual axes of both eyes will be at the spatial coordinates (h1, v1, d1). However, because the geometry of the eyes is not perfect or due to other physiological factors, the point of intersection of the visual axes of both eyes will be roughly situated at the spatial coordinates (h1, v1, d1), which does not conflict with the binocular imaging method described in the present invention.

One of the methods of rendering depth is to modulate binocular visual axis convergence angle (which is the angle between the visual axes of both eyes). When the binocular visual axis convergence angle is relatively larger when viewing an object with both eyes, the object perceived is closer to the user; conversely, when the binocular visual axis convergence angle is relatively smaller when viewing an object with both eyes, the object perceived is farther away from the user. In FIG. 1, the second binocular pixel BP2 is generated by brain image fusion after the user's first eye (such as the right eye) perceives a first collimated light signal S1' (such as a right light signal) and the user's second eye (such as the left eye) perceives a second collimated light signal S2' (such as a left light signal). A second optical convergence angle $\varphi 2$ is defined between the optical path extensions of the first collimated light signal S1' and the second collimated light signal S2', and the point of intersection of the optical path extensions of the first collimated light signal S1' and the second collimated light signal S2' is situated at the spatial coordinates (h1, v1, d2). Since the relative binocular visual axis convergence angle of the two eyes is greater when viewing the second binocular pixel BP2 than when viewing the first binocular pixel BP1, the user perceives that the second binocular pixel BP2 is closer to them than the first binocular pixel BP1 (or that it has a smaller depth).

Notice that an image of a virtual object is composed of a plurality of virtual binocular pixels. The above explains the method for rendering depth perception of a virtual binocular pixel. However, this method can be applied to multiple virtual binocular pixels simultaneously; as a result, a virtual object with 3-dimensional contour (each portion of the virtual object has different depth) can be created. This method is different from the parallax method utilized in the conventional 3-dimensional contour rendering method.

It is noteworthy that, unlike traditional VR or AR head-mounted displays, users do not need to fixate on the screen when using the three-dimensional (3D) binocular virtual image imaging method described here. Instead, this method allows users to focus on a specific location in actual space. The light direction adjuster and light emitter then adjust and project the optical path to align with natural depth perception, directing it to the appropriate location on the retina to create the perception of depth in the 3D binocular virtual image. In one embodiment, the head-mounted display can project a panoramic view of each frame at a given field of view simultaneously, enabling the user's retina to receive all 3D binocular virtual images at once. Users can then adjust their viewing direction freely to focus on the 3D binocular virtual images at any locations.

Figure 2:
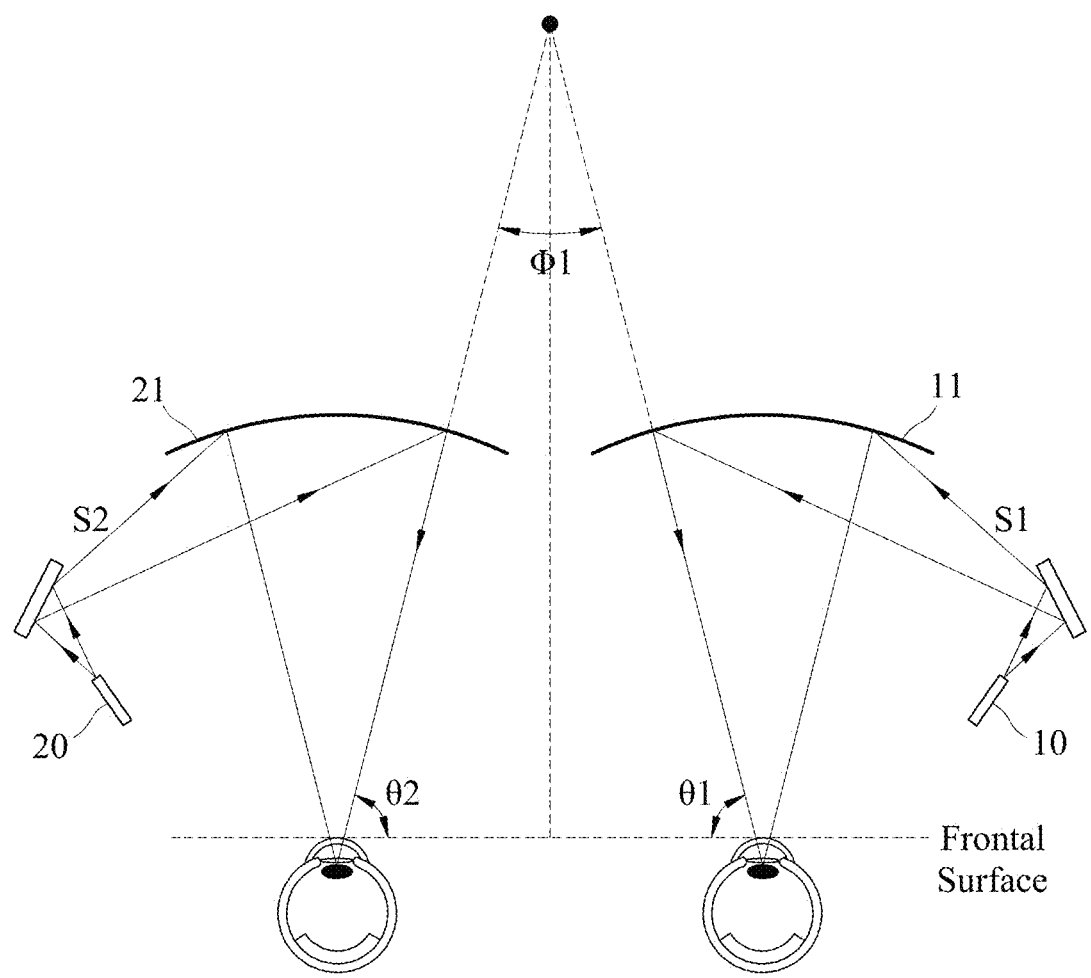
FIG. 2 is a schematic view showing a possible mechanism for rendering binocular virtual image imaging with depth in accordance with this disclosure.

The exemplary method for rendering a 3D binocular virtual image with depth perception in accordance with an embodiment of this disclosure will be further illustrated hereinafter. In FIG. 2, the head wearable display 90 of this disclosure has a first emitter 10 and a second emitter 20. In addition, the head wearable display 90 has a first light direction adjuster 11 and a second light direction adjuster 21 for changing the direction of a first collimated light signal S1 and a second collimated light signal S2 emitted by the first emitter 10 and the second emitter 20 respectively. For example, the first and second emitters 10, 20 can be laser beam scanning projectors (LBS projectors), which include light sources such as red laser, green laser and blue laser, light color regulators (such as bi-directional color light direction adjuster and polarized light direction adjuster), and two-dimensional (2D) adjustable reflectors (such as 2D microelectromechanical system "MEMS" mirrors). In some embodiments, the two-dimensional (2D) adjustable reflectors can be provided separately from the first and second emitters 10, and 20. The 2D adjustable reflectors can be substituted by two one-dimensional (1D) reflectors (such as two 1D MEMS mirrors). The angle of projection of the projected light signal is modulated and changed by the 2D adjustable reflectors. Thereby, the optical path and optical convergent angle of the emitted light signals can be modulated and controlled. The LBS projector sequentially generates and scans the light signal to form a 2D image with a predetermined resolution, for example, each frame has 1280×720 pixels. Therefore, a light signal with one pixel is generated at a time, and one pixel is projected towards the first light direction adjuster 11 and the second light direction adjuster 21 at a time. In order to let the user see the image with one eye, the LBS projector must sequentially generate the light signal of each pixel within the duration of visual persistence (such as $\frac{1}{18}$ second), such as a 1280×720 light signal. Therefore, the visual persistence time of each light signal is approximately 60.28 nanoseconds. In another embodiment, the first and second emitters 10, 20 are digital light processing projectors (DLP projectors) capable of generating a color image at a time. Texas Instrument's DLP technology is one of the technologies capable of producing DLP projectors. The whole 2D color image frame, such as the one having 1280×720 pixels, can be projected at the same time.

The first light direction adjuster 11 and the second light direction adjuster 21 receive and redirect the plurality of light signals generated by the first emitter 10 and the second emitter 20. In an embodiment, the first light direction adjuster 11 and the second light direction adjuster 21 reflect the plurality of light signals and set the redirected light signal and the incident light signal on the same side of the first light direction adjuster 11 and the second light direction adjuster 21. In an embodiment, the first light direction adjuster 11 and the second light direction adjuster 21 can be in the form of an eyeglass lens, and the relative light signals incident on the opposite sides of the first light direction adjuster 11 and the second light direction adjuster 21 can be at least partially transparent relative to the ambient light from the environment of the user. In different embodiments, the degree of transparency can vary considerably. In an AR/MR application, the transparency is preferably 50%, and more preferably 75% in other embodiments. In addition, in order to redirect the light signal, the first light direction adjuster 11 and the second light direction adjuster 21 can merge a plurality of light signals to form a light direction adjuster image and let it pass the user's pupil and arrive the user's retina. Notice that no image is formed on first light direction adjuster 11 and the second light direction adjuster 21. Their purpose is for redirected light emitted by the first and second emitters 10, 20 to specific locations on the retina. The advantage of using the reflective light direction adjuster is that it does not use a light guide plate to direct the light signal to the user's eyes as in the prior art, and thus can solve the poor diffraction effects, including complex shadows, color distortion, etc. Notice that the light emitted to the retina are all collimated. The first light direction adjuster 11 and the second light direction adjuster 21 can be holographic light direction adjusters, but such arrangement is not a preferred embodiment, since the diffraction effect can cause complex shadows and RGB distortions. In some embodiments, it is necessary to avoid using the holographic light direction adjuster.

In an embodiment, the first light direction adjuster 11 and the second light direction adjuster 21 have an ellipsoidal surface. In addition, the first emitter 10 is situated at a focus of the first light direction adjuster 11, and the user's right eye is situated at another intersection of the ellipsoid. Similarly, the second light direction adjuster 21 has an ellipsoidal surface, and the second emitter 20 is situated at the intersection on the left side, and the user's left eye is situated at the intersection on the right side of the ellipsoid. According to the geometric characteristics of the ellipsoid, all light beams projected on the ellipsoidal surface will be reflected to the other intersection. In this case, all light beams projected from the emitters onto the ellipsoidal surface of the light direction adjuster will be reflected to the user's eyes. Therefore, the field of view (FOV) can be maximized to a level comparable to the ellipsoidal surface in this embodiment. In another embodiment, the first light direction adjuster 11 and the second light direction adjuster 21 can have flat surfaces and hologram films which are configured to reflect light in an ellipsoid fashion.

The head wearable display further includes a control unit, which includes all necessary circuits to control the first emitter 10 and the second emitter 20. The control unit provides electronic signals to the emitters to generate a plurality of light signals. In an embodiment, the location and emission angle of the first emitter 10 and the second emitter 20 can affect the angle of incidence of the first collimated light signal S1 (such as the right light signal) and the second collimated light signal S2 (such as the left light signal) and the locations on the first light direction adjuster 11 (such as the right light direction adjuster) and the second light direction adjuster 21 where the light signals are received.

With reference to FIG. 2, the first angle θ1 (relative to the user's frontal surface) of the first collimated light signal S1 and the second angle θ2 (relative to the user's frontal surface) of the second collimated light signal S2 projected to the user's right eye from the first light direction adjuster 11 and the second light direction adjuster 21 can be adjusted in response to the desired target depth location of the desired 3D binocular virtual image. In some embodiments, by varying the first angle θ1 and the second angle θ2, the optical convergence angle φ (as an example, the optical convergence angle φ=180−θ1−θ2) can be manipulated to change the depth perception of the binocular virtual image perceived by the user in a continuous manner. It is worth pointing out that the optical convergence angle φ is formed by the actual optical paths of the first collimated light signal S1 and the second collimated light signal S2. The converging point is at the intersection of optical path extensions of the two collimated light signals. Unlike scattering light signals, collimated light signals has well defined optical path. Such adjustment to the optical convergence angle φ can be controlled by the control unit. In some embodiments, the control unit can communicate with an independent image signal provider via a cable or wireless mechanism. The wireless communication includes 4G and 5G telecommunications, Wi-Fi, Bluetooth, near field communication (near field communication), and network. The control unit includes a processor, a memory, an input/output interface (I/O interface) provided for the image signal provider to communicate with the user.

Figure 3:
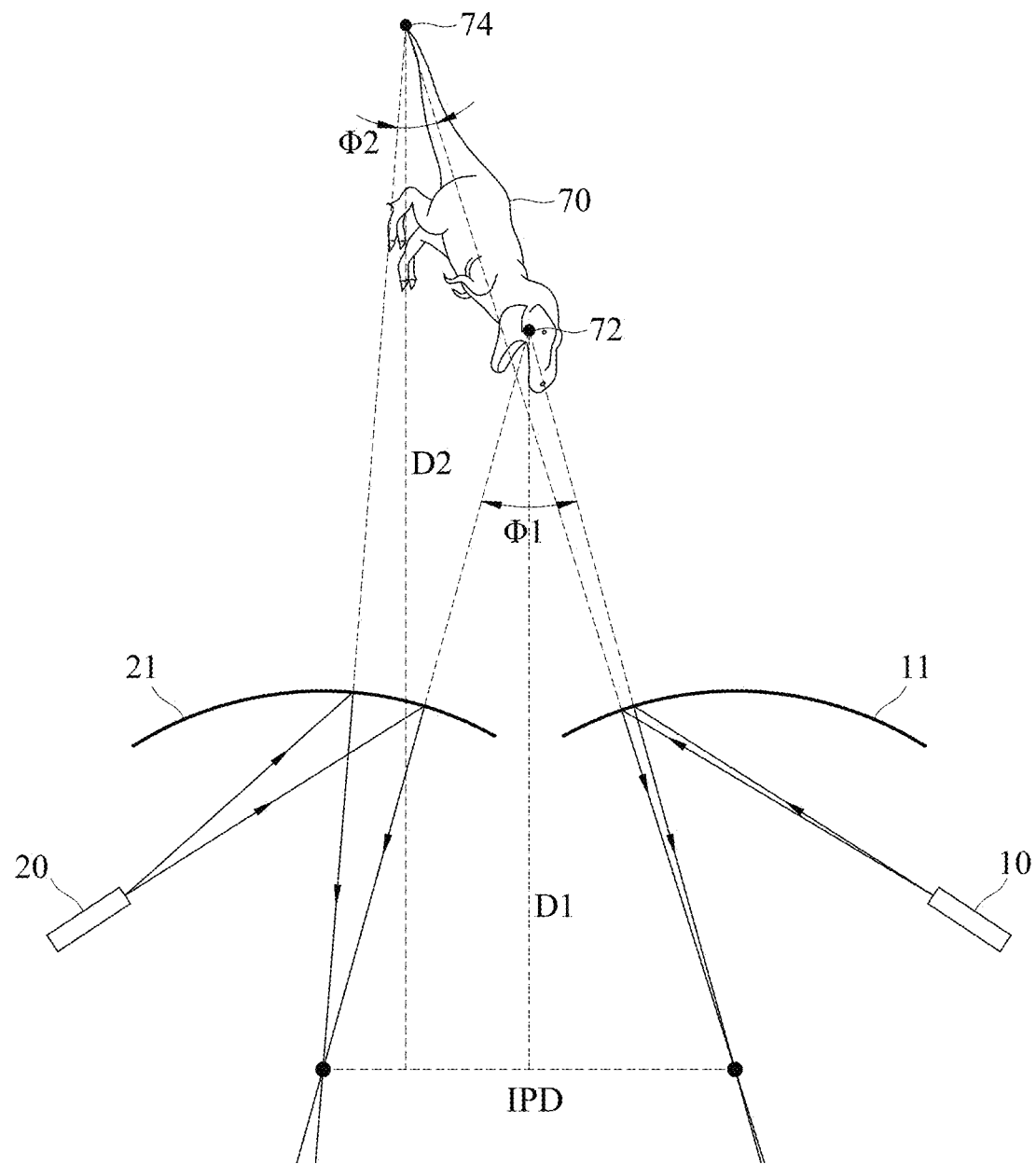
FIG. 3 is another schematic view showing binocular virtual image imaging method in accordance with this disclosure.

With reference to FIG. 3, when the 3D binocular virtual image is formed by a plurality of pixels, the first light direction adjuster 11 receives and redirects the plurality of first (such as right) collimated light signals to the user's a retina and display the plurality of right pixels of the 3D binocular virtual image. Meanwhile, the second light direction adjuster 21 receives and redirects the plurality of second (such as left) collimated light signals to the user's another retina and display the plurality of left pixels of the 3D binocular virtual image. In some embodiments, each of the first collimated light signals and its corresponding second collimated light signals contain image information of a single binocular pixel of the 3D binocular virtual image. In some embodiments, each of the first collimated light signals and its corresponding second collimated light signals may contain sustainably the same image information (e.g., color, intensity . . . , etc.). Since all the light signals are collimated, each of the light signals has a single optical path. The optical path of each first collimated light signal and its corresponding second collimated light signal have unique optical convergence angle (formed by the optical path extension of the first and second collimated light signals). The user is free to decide at which binocular pixel to focus on by matching the visual axes with the optical path (and, in turn, matching the optical convergent angle) of the collimated light signals of said binocular pixel. Therefore, all binocular virtual pixels may appear to have different depths of field. In this way, a single 3D binocular virtual image can have different depths of field at different locations (represented by different pixels). For example, when the single 3D binocular virtual image is a sphere, different optical convergence angles can be used to present the different depths of field at different parts of the sphere, so that the user gazing at each part of the sphere can perceive a different depth, thus generating a real 3D feeling, which is different from the traditional parallax 3D imaging method. In this case, when the user fixates at a specific part of the binocular virtual image formed by one of the first collimated light signals and one of the second collimated light signals, the depth of fixation is substantially the same as the depth position of intersection the optical path extensions of the first collimated light signals and the second collimated light signals forming said part of the binocular virtual image. However, in some embodiments, the traditional parallax 3D imaging method can be used in addition to the 3D rendering method in the present invention.

According to an embodiment of this disclosure, the relationship between the depth perceived and the convergence angle of the two eyes can be roughly expressed by:

$$\tan\frac{\beta}{2} = \frac{IPD}{2D}$$

where, $\beta$ is the convergence angle of two eyes, D is the depth perceived, and IPD is the interpupillary distance, which is the distance between the right pupil and the left pupil. For example, in FIG. 3, the 3D binocular virtual image 70 includes the first virtual binocular pixel 72 (having a first depth D1) and the second virtual binocular pixel 74 (having a second depth D2). The first depth D1 is related to the optical convergent angle $\varphi 1$. Particularly, the first depth D1 of the first virtual binocular pixel of the 3D binocular virtual image can be determined by the optical convergent angle $\varphi 1$ between the optical path extension of the right light signal and the corresponding left light signal. Similarly, the second depth D2 is related to the optical convergent angle $\varphi 2$. Particularly, the second depth D2 of the second virtual binocular pixel of the 3D binocular virtual image can be determined by the optical convergent angle $\varphi 2$ between the optical path extension of the right light signal and the corresponding left light signal. The user perceives that the second virtual binocular pixel 74 is farther away from the user than the first virtual binocular pixel 72 (i.e., the second virtual binocular pixel 74 has a larger depth), and the angle $\varphi 2$ is smaller than the angle $\varphi 1$).

According to the aforementioned method, this disclosure can display a 3D binocular virtual image with a continuously variable depth. In addition, this disclosure is characterized in that the location of the virtual pixel or the binocular virtual image in the physical space can be determined by utilizing the intersection of the optical path extension of the first collimated light signal S1 and the second collimated light signal S2 in the physical space. In the same time, the optical paths of the light signals are extended toward the location of the user's retina, so that when the user sees the binocular virtual pixel or the binocular virtual image, the visual axes of the two eyes will also naturally and easily match with the optical paths of the first optical signal S1 and the second optical signal S2. In this way, the 3D coordinates (including the depth) of the binocular virtual pixel or binocular virtual image in the physical space perceived by the user is consistent with the 3D coordinates (including the depth) of the intersection of the optical path extension of the first collimated light signal S1 and the second collimated light signal S2. Therefore, there would be no focal rivalry and vergence-accommodation conflict since the depth perception is in consistence with the location of fixation of the eyes.

In some embodiment, when the binocular virtual image is superimposed onto a real object in the physical space, since the 3D coordinates (including the depth) of the real object can be set to be consistent with the 3D coordinates (including the depth) of the intersection of the optical paths extension of the first collimated light signal S1 and the second collimated light signal S2, so that the user can clearly see the physical object and the binocular virtual image simultaneously without focal rivalry. In addition, when the user reaches out and interacts with the binocular virtual image by a hand, the user's hand can easily reach the perceived location of the binocular virtual image in the physical space. This is because the location at where the eyes fixate is the same as the location and perceived depth of the binocular virtual image (where the optical path extensions of the light signals intersect). This feature enables direct interaction between the bare hand of the user and the rendered virtual image without using gloves and controller. Since the location and the depth of the binocular virtual image in real space can be determined from the intersection of the optical paths extension of the first collimated light signal S1 and the second collimated light signal S2 in the physical space, therefore the binocular virtual image can be directly converted to the coordinates in the physical space, and the binocular virtual image in the physical space can be easily compared with the coordinates of the real object, and the interaction between the virtual object and the real object can be more accurate.

For the convenience of describing the present invention, for example, each location in space is represented by three-dimensional (3D) coordinates, such as the XYZ coordinates. In other embodiments, a different 3D coordinates system can be used. Therefore, each virtual binocular pixel has 3D coordinates in a horizontal direction, a vertical direction, and a depth direction. The horizontal direction (or X-axis direction) is the direction along the interpupillary line. The vertical direction (or Y-axis direction) is the direction along the facial mid line and perpendicular to the horizontal direction. The depth direction (or Z-axis direction) is orthogonal to the frontal surface, and orthogonal to the horizontal and vertical directions.

Figure 4:
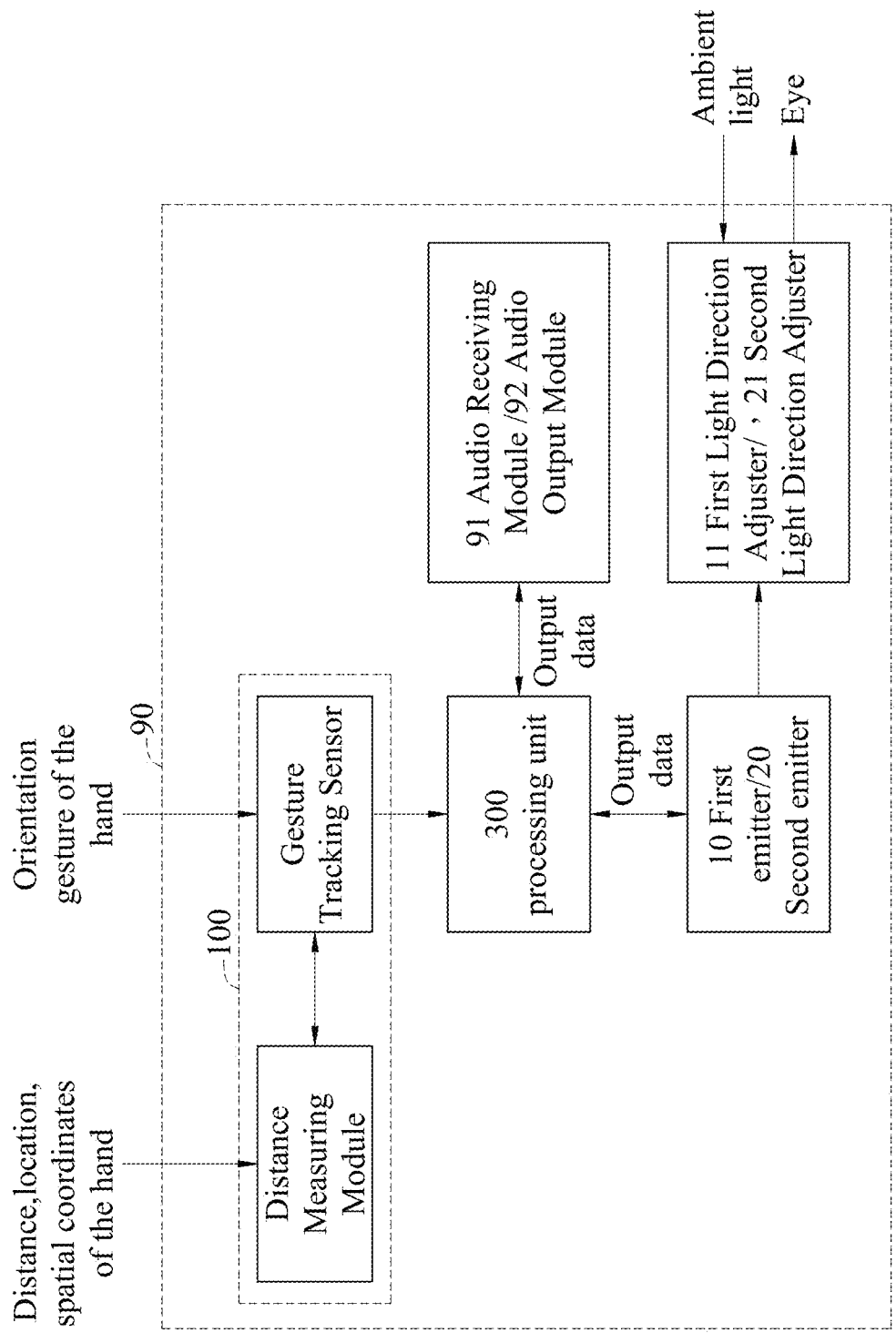
FIG. 4 is a block diagram of a computing system with a head wearable display in accordance with this disclosure.

The above 3D imaging method can be applied to head-mounted display. Furthermore, it is possible to combine the head-mounted display 90 with a personal computing environment to form a computing system by utilizing an augmented reality or virtual reality usage environment. In this way, the space of the user's environment can be utilized as a display space for the computing system. The computing system with the head wearable display in accordance with this disclosure mainly includes a processing unit 300, a head wearable display 90, and a distance measuring module 100. In some embodiment, the distance measuring module 100 may be further equipped with gesture tracking sensors. With reference to FIG. 4 for the block diagram of the present invention, the distance measuring module 100 detects a spatial location, coordinate or orientation of at least a portion of a hand of a user. In some embodiments, the distance measuring module 100 may also be provided with a gesture tracking sensor for determining the gesture or spatial location of at least a part of the hand. As an example, the distance measuring module 100 may include at least one RGB camera to receive multiple image pixels of at least one part of the user's hand, and at least one depth camera to receive the corresponding depths. The distance measuring module 100 may comprise a time-of-flight camera (ToF camera) that employs time-of-flight techniques to resolve distance between the camera and an object for each point of the image, by measuring the round-trip time of an artificial light signal provided by a laser or an LED, such as LiDAR. A ToF camera may measure distance ranging from a few centimeters up to several kilometers. Other devices, such as structured light module, ultrasonic module or IR module, may also function as a depth camera used to detect depths of objects in surroundings for the distance measuring module 100. The distance measuring module 100 may be configured to receive multiple image pixels and the depths of at least a portion of the user's hand. The gesture tracking sensor/distance measuring module 100 may determine a shape, a position, and a movement of the at least a portion of the user's hand. For example, in order to determine the shape of the user's hand, the gesture tracking sensor/distance measuring module 100 may have to first identify multiple feature points of the user's hand and then determine the 3D coordinates of these feature points.

In other embodiments, the computing system with a head wearable display may further comprise a position module (not shown) which may determine a user's position and orientation, both indoors and outdoors. The position module may be implemented by the following components and technologies: GPS, gyroscope, accelerometers, mobile phone network, Wi-Fi, ultra-wideband (UWB), Bluetooth, other wireless networks, beacons for indoor and outdoor positioning. The position module may include an integrated inertial measurement unit (IMU), an electronic device that measures and reports a body's specific force, angular rate, and sometimes the orientation of the body, using a combination of accelerometers, gyroscopes, and sometimes magnetometers. The position module may be integrated with the head wearable display 90, or may be provided separated to the head wearable display.

The computing system of this disclosure determines the spatial coordinates of a part of the user's hand via the distance measuring module 100, so as to allow comparison of the spatial coordinate location of the part of the hand in relation to the currently displayed binocular virtual image (or virtual object); the result of the comparison is used as the basis for interaction between the hand and the binocular virtual image (or virtual object). In some embodiments, the location of at least a portion of the hand may be used for determining the type of interaction between the hand and the virtual image. Regardless, the relative location between a portion (or orientation) of the user's hand and the location of the binocular virtual image are used to determine the type of the interaction between the user's hand and the binocular virtual image, the interaction may be translated to a first input data. The method for determining the type of interaction is well known in the art, and therefore, further description is omitted in the present disclosure.

After the distance measuring module 100 detects the spatial coordinate or orientation of a portion of a hand of a user, the information regarding the location or orientation of the portion of the hand (i.e., a detection data) is used for determining a first input data inputted by a user. Determining the first input data can be performed by the processing unit 300 or the distance measuring module/gesture tracking sensor 100. In some embodiments, the processing unit 300 may process the detection data (e.g., the location or orientation of the portion of the hand) received from the distance measuring module 100 and determine a first input data. The processing unit 300 generates an output data based on the first input data. Specifically, the processing unit 300 provides a computing function to the computing system of this disclosure. Therefore, the processing unit 300 may be a traditional central processing unit or graphic processing unit, or any unit providing calculating and logic operation capacity. In some embodiments, the processing unit 300 is provided in the head wearable display 90; in other embodiments, the processing unit 300 is telecommunicatively connected to the head wearable display 90 through a communication means and may be provided external to the head wearable display 90. In other embodiments, the processing unit 300 may be provided both external and internal of the head wearable display 90. The communication means may be any cable or wireless (such as WIFI, Bluetooth, RFID, etc.) communication mechanism. The head wearable display 90 receives the output data and displays a binocular virtual image related to the output data.

Figure 5:
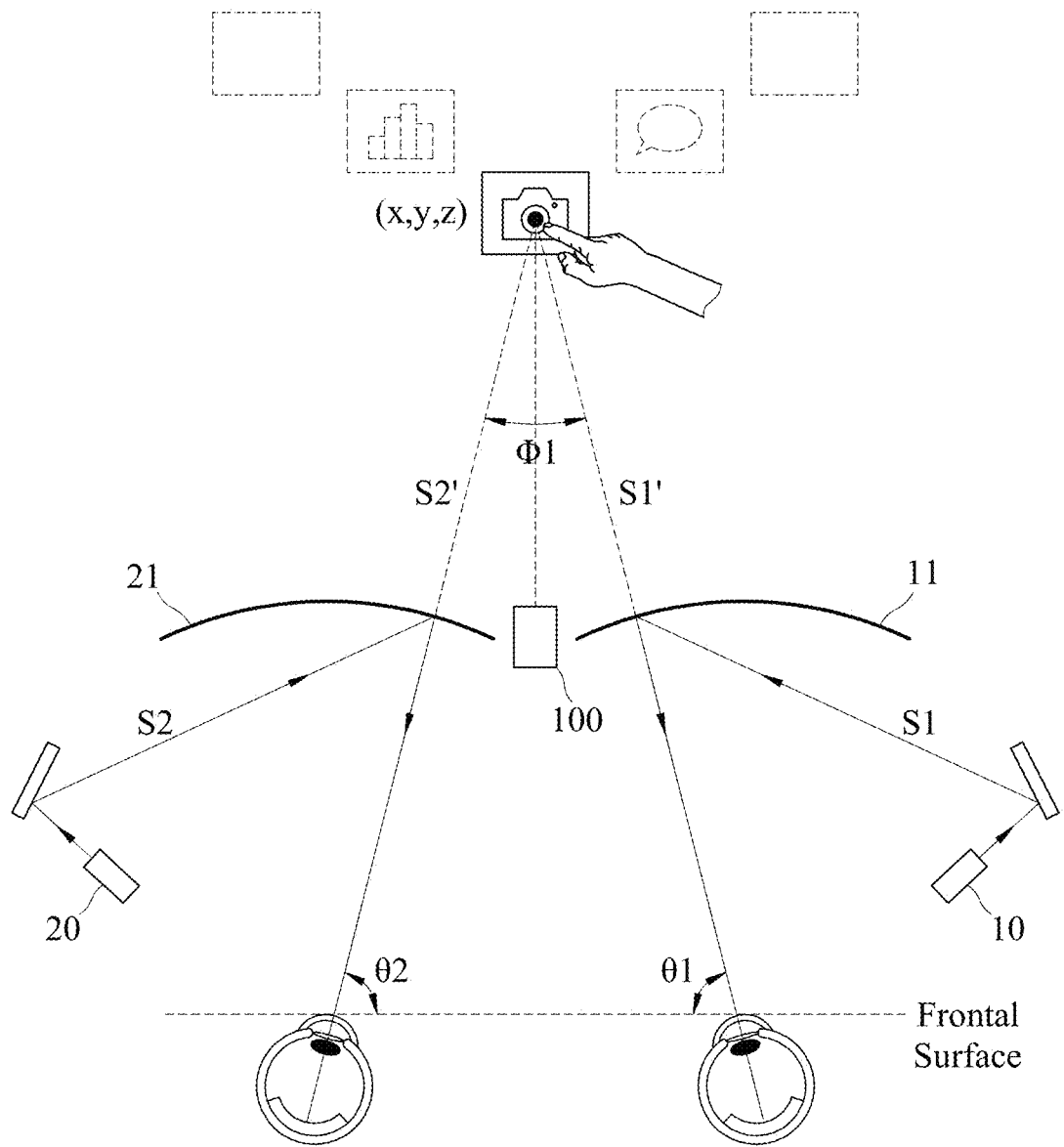
FIG. 5 is a schematic view illustrating an interaction between the hand of the the user and a binocular virtual image of a virtual object.

With reference to FIG. 5, the following describes an exemplary embodiment of the present invention. In this embodiment, the user can utilize the index figure to open an application program. For example, the head-wearable display 90 initially presents a variety of icons representing different applications for the user to choose from. Each icon is perceived by the user as occupying a specific 3D spatial location, with depth perception in real 3D space. The method for displaying icons with distinct 3D spatial locations and depth perception has been previously disclosed. However, it is important to note that the perceived locations of these icons (which are virtual images) in the real 3D space correspond to the intersections of the extended optical paths of collimated light signals composing said icons. These signals combine to create binocular pixels of the virtual image of the icons. The virtual image is composed of a plurality of binocular pixels. In some embodiments, each pixel may have a unique 3D coordinate in real space (different x, y, and depths coordinates); in some other embodiments, the pixels of the virtual image may appear to have the same depth coordinate but different x and y coordinate (so the virtual image appear to be flat but have a specific depth location in space). Since the perceived locations of a pixel of the icon in the real 3D space correspond to the intersections of the extended optical paths of collimated light signals composing the pixels, the location of the icon or the pixels of the icon can be easily mapped to the real 3D space. It is also important to note that when the user fixate at the icon or pixel, the visual axes of the eyes are pointing at the location of the icon or pixel. The intersection of the visual axes, in theory, is where the intersections of the extended optical paths of collimated light signals composing the icon or pixel located; when this happens, the optical path and optical path extensions are substantially aligned with the visual axes of the eyes of the viewer; as a result, no focal rivalry or vergence-accommodation conflict will occur.

With reference to FIGS. 4 and 5, when the user wish to interact with the virtual image with a portion of the hand (e.g., finger), the spatial coordinate or location of a part of the user's hand is detect by the distance measuring module 100, the spatial coordinate or location of the part of the user's hand may be compared with the coordinate of the virtual image (e.g., icon or a key of a virtual keyboard); and, based on the comparison, the visual appearance of the binocular virtual image may be altered (e.g., glow, highlight, or moved), or, an application program, or an action may be activated as the result of the interaction. There may be several types of interaction between the portion of the hand and the virtual object. As an example, the interaction between the portion of the hand and the virtual image may be user using the portion of the hand to touch or click on the virtual image. The type of interaction may be determined based on several factors. For example, it can be determined based on which portion of the hand is interacting with the virtual object, the location and orientation of the portion of the hand, the relative location of the hand and the virtual image, or the relative speed between the portion of the hand and the virtual object . . . etc. A first input data is generated based on the type of the interaction between the portion of the hand and the virtual image. The first input data is related to the action needed to be taken by the computing system in the proceeding steps. The processing unit receives the first input data and generates an output data based on the first input data to execute the corresponding action. For example, the corresponding action may be changing the coordinate of the virtual image (i.e., the virtual image is moved by the user), displaying a letter typed by the user, or activating an application. The head wearable display 90 will then display the corresponding action for the user.

With reference to FIGS. 4 and 5 again for the block diagram of a head wearable display 90 in accordance with an embodiment of this disclosure, the head wearable display 90 further includes an audio output module 92 for outputting an audio related to the output data. For example, the audio output module 92 can be a speaker installed to the head wearable display 90. In some embodiments, the output data may include an image data and a sound data, and the head wearable display 90 can display the image data, and the speaker can output the sound data. In another embodiment of this disclosure, the user can ask the computing system to execute an instruction through voice control. Accordingly, the head-mounted display 90 may also include an audio receiving module 91, such as a microphone, for receiving a fourth input data from the user, which may be the user's voice received by the audio receiving module 91, and then recognized by the computing module 200 for the voice recognition and the execution of the corresponding instruction. In some embodiments, the head wearable display 90 may also be installed with a gesture tracking sensor/distance measuring module 100. The computing system of this disclosure determines the spatial coordinates of a part of the user's hand through the gesture tracking sensor/distance measuring module 100, so as to allow comparison of the spatial coordinate location of the part of the hand in relation to the currently displayed virtual image (or virtual object), which is used to realize the basis for interaction between the hand and the virtual image. In some embodiments, the head-mounted display 90 may also include an inertia measurement module to determine the spatial orientation of the user's head.

Figure 6A:
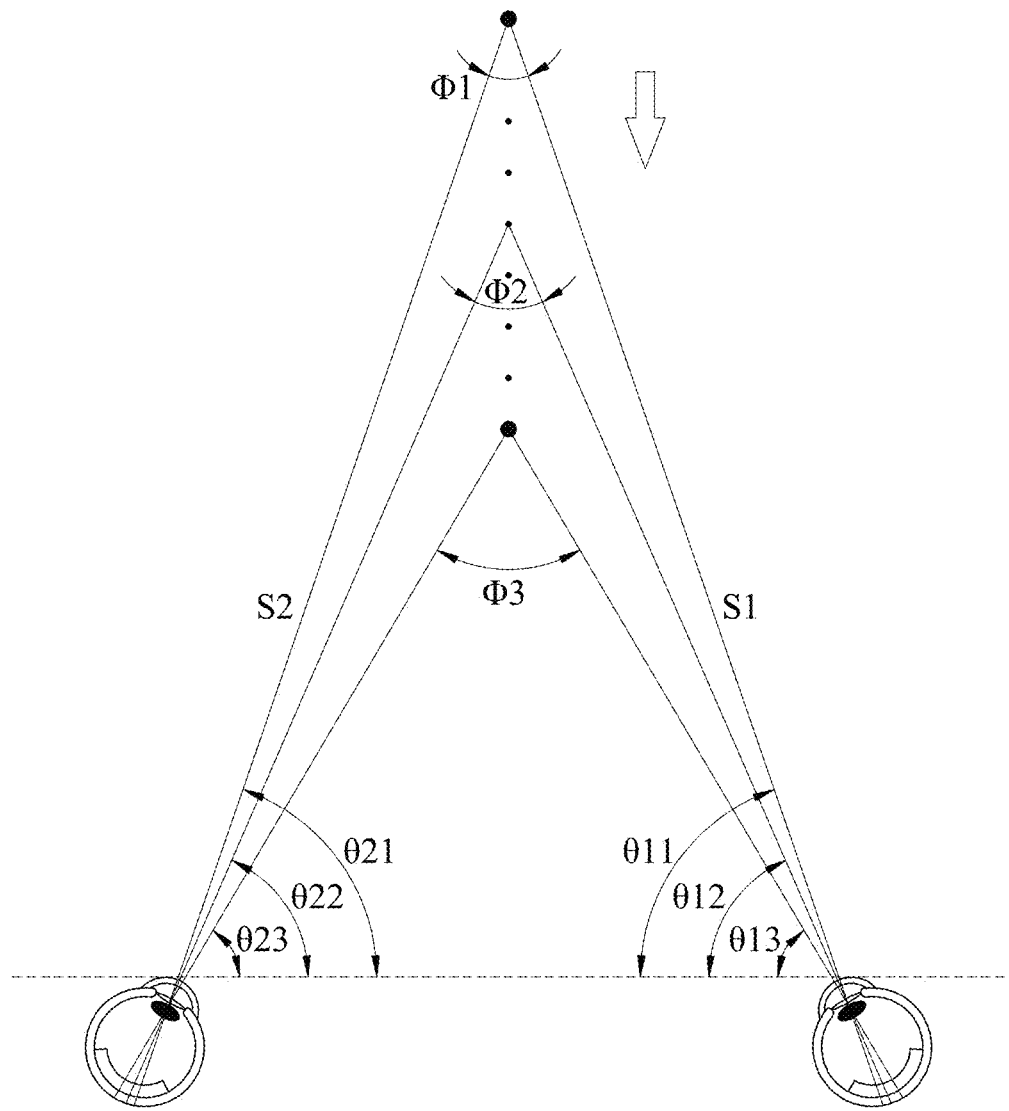
FIG. 6A is a schematic diagram showing a method of displaying a continuously variable depth of binocular virtual images in accordance with this disclosure.
Figure 6B:
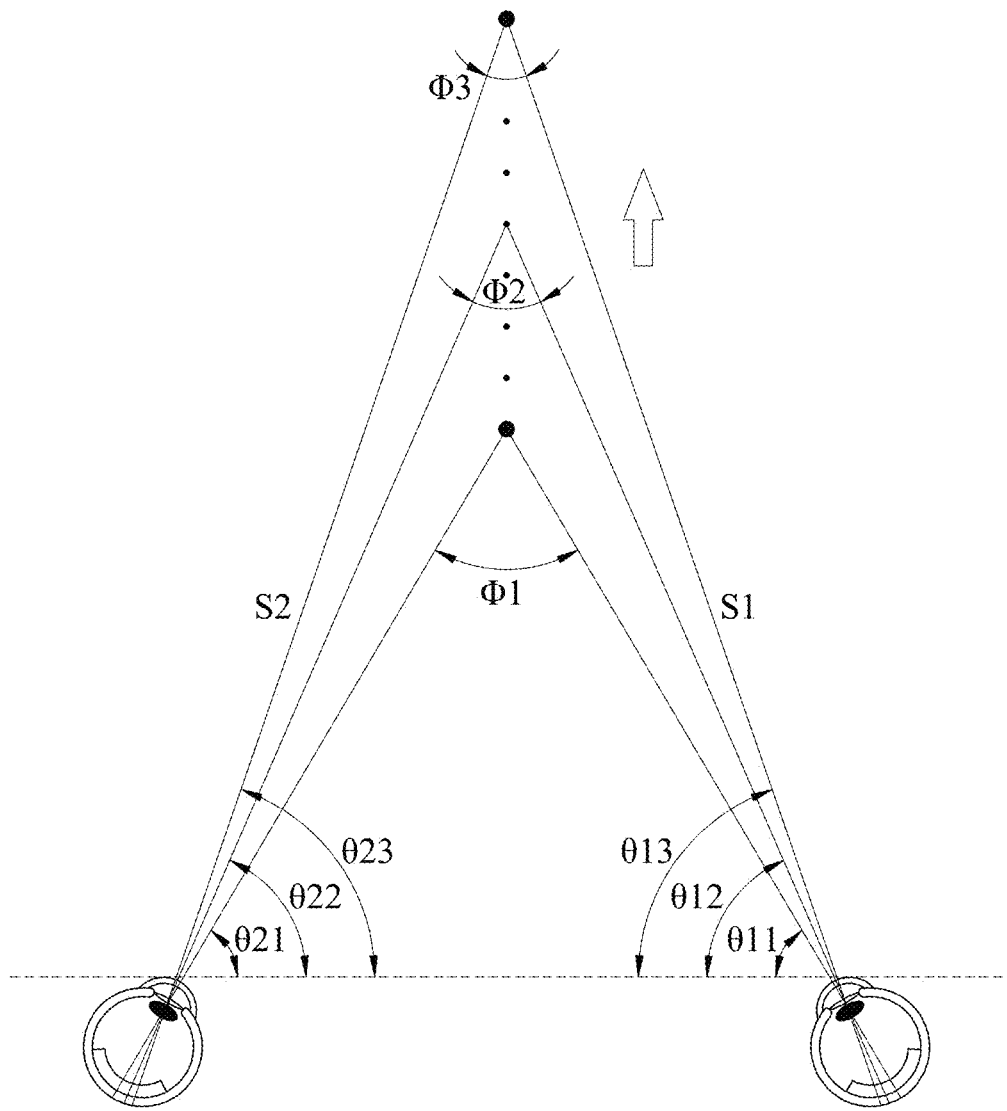
FIG. 6B is another schematic diagram showing a method of displaying a continuously variable depth of binocular virtual images in accordance with this disclosure.

The technical characteristics of the interaction between the user and the binocular virtual image of this disclosure will be described below. In FIGS. 6A and 6B, the first light direction adjuster 11 and the second light direction adjuster 21 of the head wearable display 90 of this disclosure change the direction of the first collimated light signal and the second collimated light signal emitted by the first emitter 10 and the second emitter 20 respectively, such that the first collimated light signal and the second collimated light signal are emitted to a first eye and a second eye relative to the first angle θ1 and the second angle θ2 of the user's frontal surface. The optical path of the first collimated light signal and the second collimated light signal are altered consequently. To the user, the location of a virtual image of the virtual binocular pixel in real space is located at where the optical path extension of the first collimated light signal and the optical path extension of the second collimated light signal intersect. The first angle θ1 and the second angle θ2 are changeable continuously to adjust an optical convergence angle of optical paths of the first collimated light signal and the second collimated light signal. The location where the optical path extension of the first collimated light signal and the optical path extension of the second collimated light signal intersect also changes continuously; as a result, the depth of the virtual binocular pixel is modulated to form a binocular virtual image having continuously variable depth perceivable by the user.

For example, when the user uses the hand to drags the virtual object and move a virtual object formed by the binocular virtual image back and forth, the processing unit 300 is configured to send a signal to the head wearable display 90 to display a change in spatial location of the binocular virtual image of the virtual object so the depth of the binocular virtual image continuously changes with the depth of the coordinates of the hand. In this case, the first angle θ1 and the second angle θ2 are continuously changed to adjust the optical convergence angle and optical path of the first collimated light signal and the second collimated light signal to modulate the depth of the binocular virtual image perceived by the user. In this case, the location of the intersection of the optical path extensions of the first collimated light signal and the second collimated light signal also changes accordingly. When the user's eyes fixate at the binocular virtual image constituted by the first collimated light signal and the second collimated light signal, the user changes the convergence angle of the visual axes of the eyes along with the change of the optical convergent angle. In conjunction with the continuously changing intersection location of the optical path extension of the first collimated light signal and the second collimated light signal in the physical space, the user can perceive the continuously changing location of the binocular virtual image in the physical space. Since the intersection location of the optical path extension of the first collimated light signal and the second collimated light signal actually exist in the physical space, the location of the binocular virtual image directly corresponds to a spatial location in real physical space; therefore, it facilitates the interaction between a real object (e.g., the user's hand) and the when the binocular virtual image. Furthermore, when user fixates at the binocular virtual image, the user can align the visual axes with the optical path or optical path extension of the first collimated light signal and the second collimated light signal. This enable the possibility that the fixation location of the eye, the location of the binocular image in physical space and the location where the hand of the user interacts with the binocular image to be at the same location in physical space. As a result, no focal rivalry and VAC can occur, which is advantageous relative to the prior arts.

During the interaction between the hand of the user and the binocular virtual image, the processing unit compares the current spatial location of the binocular virtual image with the spatial coordinates of the part of the user's hand measured by the distance measuring module 100, and based on the comparison, the type of interaction may be determined. For example, suppose the binocular virtual image is a window of an application, the user can use two fingers to pinch at the corner of the window and drag the window away from the user. In this case, the gesture tracking sensor/distance measuring module 100 recognize the gesture of pinching and detect the spatial location of the fingers relative to the window, so when the user moves the fingers, the coordinates (or location) of the windows is change to illustrate that the window is moved by the user. In another example, suppose the binocular virtual image is an icon of an application, the user can use one finger to click on the icon to activate an application program. In this case, the gesture tracking sensor/distance measuring module 100 recognize the gesture of clicking and detect the spatial location of the finger relative to the icon, so when the user clicks and touches the icon, the icon may be highlighted and a corresponding application is activated. In some embodiments, the binocular virtual image may be a keyboard containing a plurality of keys.

As mentioned earlier, in the present invention the location in physical space of the binocular virtual image is directly related to the intersection between optical path extensions of the collimated light signals. Therefore, when the user tries to interact with the binocular virtual image, it is easy for the gesture tracking sensor/distance measuring module 100 to detect whether the coordinate of the hand is in proximity to the location of the binocular virtual image. Unlike the previous art, no medium (such as a cursor, mouse, or gloves . . . , etc.) is need for the user to interact with the virtual image. According to the present invention, once a part of the user's hand is in proximity to the intersection of the optical path extensions of the first collimated light signal and the second collimated light signal, the interaction between the user's hand and the binocular virtual image may be triggered. As mentioned earlier the coordinates of a part of the user's hand can be determined by the gesture tracking sensor/distance measuring module 100; and the coordinate is than compared to that of the binocular virtual image.

The major difference between this disclosure and the prior art is that users can accurately touch the seen virtual object and interact with the seen virtual object, as suppose in a situation that the user's perceived location of the virtual object being different from the actual coordinate of the virtual object. This is due to the fact that the optical paths extension of the first collimated light signal and the second collimated light signal (forming the virtual object) form an intersection in the physical space, and the actual spatial coordinates of the intersection are registered in the computing system with the head-mounted display 90, and then the coordinates of a part of the user's hand in the physical space are known by the gesture tracking sensor 100 disposed on the head-mounted display 90, and the computing system with the head-mounted display 90 knows whether or not the user has touched the virtual object by comparing the coordinates of the part of the hand in the physical space with the coordinates of the part of the virtual object in the physical space. More importantly, when the user of the head-mounted display 90 intends to interact with the virtual object, the user must fixate at the virtual object and move his or her hand to the location of the virtual object to touch the virtual object. Therefore, when the user fixates at a part of the binocular virtual image formed by the first collimated light signal and the second collimated light signal and touches the part of the binocular virtual image at the fixated location by a part of the hand to initiate the interaction, the location of the part of the hand is substantially the same as the fixated location. At this time, the user can clearly perceive his/her hand and the virtual object without focal rivalry caused by the different depths of field perception between the virtual and real objects, and the user can perceive the location of the virtual object more accurately.

While the disclosure has been described by means of specific embodiments, it is to be understood that the disclosure is not limited thereto. To the contrary, numerous modifications and variations could be made thereto by those skilled in the art without departing from the scope and spirit of the disclosure set forth in the claims.

What is claimed is:

1. A computing system with a head wearable display, comprising:
a distance measuring module, for detecting a spatial coordinate of a portion of a hand of a user, wherein the location or orientation of the portion of the hand is used for determining a first input data inputted by a user,
a processing unit, generating an output data in based on the first input data; and
a head wearable display configured to be worn by the user, comprising the distance measuring module, for displaying a binocular virtual image related to the output data, wherein the head wearable display comprises a first emitter configured to emit and scan a first collimated light signal, a second emitter configured to emit and scan a second collimated light signal, a first light direction adjuster and a second light direction adjuster for changing directions of the first collimated light signal and the second collimated light signal to redirect the first collimated light signal and the second collimated light signal with a first angle and a second angle relative to the user's frontal surface towards a first eye and a second eye of the user respectively, wherein an optical path extension of the first collimated light signal and an optical path extension of the second collimated light signal intersect at a spatial location to define a location of a virtual binocular pixel of the binocular virtual image, and the first angle and the second angle are changeable continuously to adjust an optical convergence angle of optical paths of the first collimated light signal and the second collimated light signal to modulate a depth of the virtual binocular pixel, to form the binocular virtual image having continuously variable depth perceivable by the user;
wherein the processing unit is configured to compare a current spatial location of the binocular virtual image, which is located at the intersection of the optical path extension of the first collimated light signal and the optical path extension of the second collimated light signal, with the spatial coordinates of the part of the user's hand measured by the distance measuring module, and based on the comparison, to change the binocular virtual image or activate an application program,
whereby when the intersection of the optical path extensions of the first collimated light signal and the second collimated light signal and coordinates of the part of the user's hand are in proximity to each other, the user's hand interacts with the binocular virtual image.

2. The computing system with a head wearable display according to claim 1, wherein when the user fixates at the part of the binocular virtual image formed by the first collimated light signal and the second collimated light signal, a depth position of intersection of optical path extensions of the first collimated light signal and the second collimated light signal forming the part of the binocular virtual image is substantially the same as a depth of fixation.

3. The computing system with a head wearable display according to claim 1, wherein the visual axes of the eyes are substantially aligned with optical paths and optical path extensions of the first collimated light signal and the second collimated light signal of one of the virtual binocular pixels.

4. The computing system with a head wearable display according to claim 1, wherein when the user uses the part of the hand to interact with the binocular virtual image, the processing unit is configured to signal the head wearable display to display a change in spatial location of the binocular virtual image, whereby a depth of the binocular virtual image continuously changes with a depth of the coordinates of the hand.

5. The computing system with a head wearable display according to claim 1, wherein the head wearable display further comprises an audio output module for outputting an audio related to the output data.

6. The computing system with a head wearable display according to claim 1, wherein the head wearable display further comprises an audio receiving module for receiving a fourth input data from the user.

7. The computing system with a head wearable display according to claim 1, wherein the distance measuring module detects the spatial coordinate of the portion of the hand that is bare.

8. The computing system with a head wearable display according to claim 1, wherein the first light direction adjuster and the second light direction adjuster are at least partially transparent relative to ambient light from an environment of the user.

9. The computing system with a head wearable display according to claim 1, wherein the binocular virtual image is a keyboard.

10. The computing system with a head wearable display according to claim 1, wherein the virtual image is composed of a plurality of binocular pixels and each pixel has a unique 3D coordinate in real space, the virtual image is rendered by multiple first collimated light signals and multiple corresponding second collimated light signals.

* * * * *